United States Patent
Komine

(10) Patent No.: US 7,034,992 B2
(45) Date of Patent: Apr. 25, 2006

(54) BRIGHTNESS ENHANCEMENT OF DIODE LIGHT SOURCES

(75) Inventor: Hiroshi Komine, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 53 days.

(21) Appl. No.: 10/681,648

(22) Filed: Oct. 8, 2003

(65) Prior Publication Data
US 2005/0078353 A1    Apr. 14, 2005

(51) Int. Cl.
  *H01S 3/00* (2006.01)
  *G02B 6/308* (2006.01)
(52) U.S. Cl. .......................... 359/334; 385/71
(58) Field of Classification Search ............... 359/334; 385/106
See application file for complete search history.

(56) References Cited

U.S. PATENT DOCUMENTS

| | | | |
|---|---|---|---|
| 5,299,222 A | 3/1994 | Shannon et al. | 372/75 |
| 5,533,163 A * | 7/1996 | Muendel | 385/126 |
| 5,555,254 A | 9/1996 | Injeyan et al. | 372/33 |
| 5,646,773 A | 7/1997 | Injeyan et al. | 359/337 |

(Continued)

FOREIGN PATENT DOCUMENTS

EP   1229674 A1 *   8/2002

OTHER PUBLICATIONS

Robert Stegeman, et al., Tellurite glasses with peak absolute Raman gain coefficients up to 30 times that of fused silica, Optics Letters, Jul. 1, 2003, pp. 1126-1128, vol. 28, No. 13.

(Continued)

*Primary Examiner*—Deandra M. Hughes
(74) *Attorney, Agent, or Firm*—Katten Muchin Rosenman LLP; John S. Paniaguas

(57) ABSTRACT

Briefly, the present invention relates to a system for combining the output light beams of a plurality of semiconductor laser diodes, for example, to form a combined light beam with increased brightness. The output light beams from the semiconductor laser diodes are coupled to a plurality of optical fibers forming a fiber coupled diode array. The optical fibers forming the fiber coupled diode array are coupled to a dual clad optical fiber with a central core. The output light beams from the optical fibers from the fiber coupled diode array are coupled to the inner cladding of a dual clad optical fiber. A Stokes seed source is applied to the central core, and the inner-clad diode light acts as a pump source to amplify the Stokes beam by stimulated Ramans scattering, thereby transferring power from the inner cladding into Stokes beam in the central core. The configuration in accordance with the present invention provides a Stokes output light beam with a relatively higher brightness level than known techniques which merely combine the output light beams from a plurality of semiconductor diodes and eliminates the need for a relatively precise alignment and the cost associated with the lenses required by known systems.

9 Claims, 1 Drawing Sheet

U.S. PATENT DOCUMENTS

| | | | |
|---|---|---|---|
| 5,668,903 A | 9/1997 | Neuberger et al. | 385/38 |
| 5,675,685 A | 10/1997 | Fukuda et al. | 385/89 |
| 5,764,675 A | 6/1998 | Juhala | 372/50 |
| 5,793,783 A | 8/1998 | Endriz | 372/31 |
| 5,949,941 A * | 9/1999 | DiGiovanni | 385/127 |
| 6,005,717 A | 12/1999 | Neuberger et al. | 359/619 |
| 6,094,297 A | 7/2000 | Injeyan et al. | 359/345 |
| 6,101,199 A | 8/2000 | Wang et al. | 372/6 |
| 6,157,763 A * | 12/2000 | Grubb et al. | 385/126 |
| 6,178,040 B1 | 1/2001 | Injeyan et al. | 359/346 |
| 6,229,939 B1 | 5/2001 | Komine | 385/29 |
| 6,259,842 B1 * | 7/2001 | Giltner | 385/48 |
| 6,416,234 B1 * | 7/2002 | Wach et al. | 385/70 |
| 6,535,660 B1 * | 3/2003 | Judy | 385/15 |
| 6,624,927 B1 * | 9/2003 | Wong et al. | 359/334 |
| 6,819,861 B1 * | 11/2004 | Ota et al. | 385/146 |
| 2003/0174977 A1 * | 9/2003 | Mayer et al. | 385/100 |
| 2004/0095968 A1 * | 5/2004 | Avizonis et al. | 372/6 |

OTHER PUBLICATIONS

"Coupling of High-Power Diode Laser Arrays and Fibers," Li Lina, Changchun Institute of Optics, Fine Mechanics and Physics, Chinese Academy of Sciences, pp. 201-203.

"Fiber Coupling of Laser Diode Arrays for High Brightness: Cladding Considerations," Bolesh J. Skutnik and Holly Park, CeramOptec Industries, Inc., pp. 86-93.

* cited by examiner

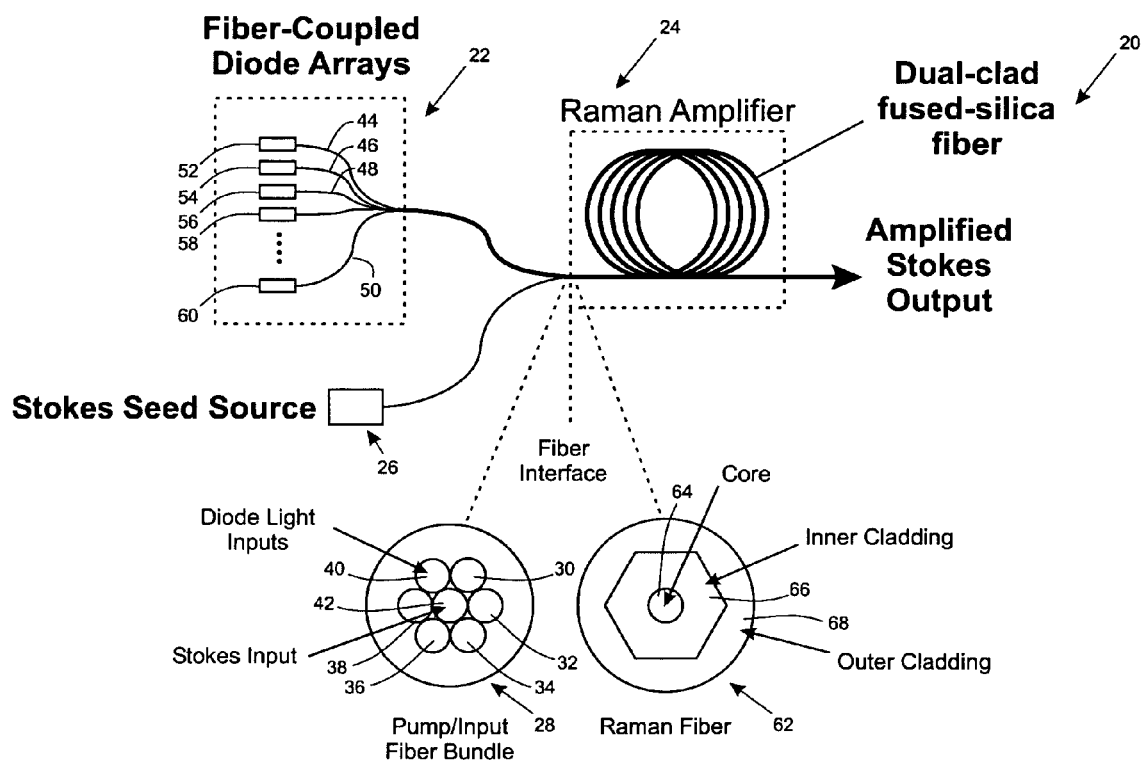

BRIGHTNESS ENHANCEMENT OF DIODE LIGHT SOURCES

BACKGROUND OF THE INVENTION

1. Field of the Invention

The present invention relates to semiconductor diode lasers and more particularly to brightness enhancement of semiconductor laser diodes utilizing stimulated Raman scattering.

2. Description of the Prior Art

Semiconductor laser diodes are known in the art. Such semiconductor laser diodes are used in various applications including optical pumping of solid state lasers. Examples of such semiconductor diode lasers used in such applications are disclosed in commonly owned U.S. Pat. Nos. 5,555,254; 5,646,773; 6,094,297; and 6,178,040. Such semiconductor laser diodes are used to optically excite the Nd:YAG slabs to a relatively high energy meta-stable state.

Techniques are known for increasing the output power and brightness or intensity of such semiconductor laser diodes. For example, U.S. Pat. No. 5,764,675 discloses a semiconductor diode laser array that optimizes the laser output power by optimizing the heat removal from the diode laser array. In particular, the '675 patent discloses a diode laser array which includes a diode laser bar that is thermally connected to a heat exchanger. With such configuration, waste heat removal is optimized, thereby allowing the brightness of the semiconductor diodes to be increased.

In order to further increase the brightness of such semiconductor laser diodes, the coupling efficiency of the output light beam from the semiconductor diode has been improved. For example, U.S. Pat. No. 5,299,222 discloses a system for optically coupling the output light beam from a semiconductor laser array to a plurality of optical fibers; each optical fiber being coupled to an individual semiconductor diode laser within the array. A plurality of mirrors and lenses is used to optically couple the output light beams from each of the semiconductor diodes forming the array into a respective optical fiber.

The brightness or intensity level of such semiconductor diode lasers has been further increased by combining the individual output light beams from a semiconductor laser diode array into a single compound beam having a higher brightness than the brightness of an output light beam of any of the individual semiconductor diode lasers. In particular, U.S. Pat. Nos. 5,668,903; 5,793,783; and 6,005,717 disclose various techniques for combining the output light beams of a plurality of semiconductor diode lasers into a compound light beam having a relatively high brightness. In particular, the '903 patent discloses a semiconductor diode array which includes a plurality of lenses for focusing the output of each semiconductor diode laser into an optical fiber with a circular cross section. The plurality of optical fibers, in turn, is coupled to an optical combiner, formed from a optical waveguide having a cross section sufficient to encompass the individual cross sections of all of the optical fibers optically coupled thereto. The output of the optional fiber is a single output light beam having a brightness much greater than any of the individual output light beams of the semiconductor laser diode. The '903 patent also discloses specially formed optical waveguides to further improve the coupling efficiency of the output of the optical combiner to a downstream device.

U.S. Pat. No. 5,793,783 discloses yet another method to provide enhanced brightness of a semiconductor laser diode. In particular, the '783 patent discloses a system which includes a semiconductor laser diode array in an optical system for focusing the individual output light beams from each of the semiconductor laser diodes in the semiconductor diode laser array into a single light spot. The optical subsystem includes a cylindrical lens configured with a length equal to the length of the semiconductor laser diode array. The cylindrical lens is used to reduce the transverse divergence and thus collimate the light from the individual semiconductor laser diodes in a particular direction. A lens array is provided downstream of the cylindrical array lens. The lens array includes a single lenslet for each semiconductor diode in the array. The lens array further reduces the divergence of the light beam. A focusing lens 19 is used to converge the output light beams from each of the individual lenslets in the lens array to a single light spot having a relatively increased brightness.

U.S. Pat. No. 6,005,717 also discloses a technique for increasing the brightness of an output beam of a semiconductor diode by combining the output beams of a array of semiconductor diodes providing a combined beam with increased brightness and power density. The '717 patent is similar to the '783 patent and utilizes a cylindrical lens and a lens array for focusing the output light beams from the array of semiconductor diodes to a single light spot by way of a focusing lens.

Although the systems discussed above provide a semiconductor diode array having increased brightness, these systems require fairly accurate optical alignment in order to produce an output beam having increased brightness. In addition, such prior art systems require a number of lenses which increase the cost of the system. Thus there is a need for a method for increasing the brightness of a semiconductor diode which is less expensive and does not require relatively precise alignment.

SUMMARY OF THE INVENTION

The present invention relates to a system for combining the output light beams of a plurality of semiconductor laser diodes, for example, to form a combined light beam with increased brightness. The output light beams from the semiconductor laser diodes are coupled to a plurality of optical fibers forming a fiber coupled diode array. The optical fibers forming the fiber coupled diode array are coupled to a dual clad optical fiber with a central core, an inner cladding and an outer cladding. The output light beams from the optical fibers from the fiber coupled diode array are coupled to the inner cladding of a dual clad optical fiber as pump light. A Stokes seed source is applied to the central core and is amplified by the pump light by stimulated Raman scattering. The configuration in accordance with the present invention provides a output Stokes light beam from the central core with a relatively higher brightness level than known techniques which merely combine the output light beams from a plurality of semiconductor diodes and eliminates the need for a relatively precise alignment and the cost associated with the lenses required by known systems.

DESCRIPTION OF THE DRAWINGS

These and other advantages of the present invention will be readily understood with reference to the following specification and attached drawing wherein:

FIG. 1 is a block diagram of a system in accordance with the present invention for providing enhanced brightness of a semiconductor diode laser.

DETAILED DESCRIPTION

The present invention relates to a technique for providing enhanced brightness of one or more semiconductor diode lasers. Unlike known systems, the system in accordance with the present invention eliminates the need for precise alignment and multiple lenses while at the same time provides enhanced brightness of a semiconductor diode output beam. As will be discussed in more detail below, the system in accordance with the present invention combines the output light beams from a plurality of semiconductor diodes forming a diode array into a combined light beam in a dual clad optical fiber with a central core. A Stokes seed source is confined to the inner core of the optical fiber while the output light beams from a fiber coupled diode array are confined to an inner cladding. The fiber-coupled light beams act as a pump source to amplify the Stokes seed beam in the central core by way of stimulated Raman scattering to provide an output Stokes beam that is shifted in frequency and has an brightness which exceeds the brightness of the combined light beams of the semiconductor lasers forming the array.

Referring to FIG. 1, the system in accordance with the present invention, generally identified with the reference numeral 20, includes a fiber coupled diode array 22, and Raman amplifier 24 and a Stokes seed source 26. The output of the Raman amplifier 24 may be used; directly for certain applications; coupled to another Raman amplifier to increase brightness further; or utilized to pump a high power dual clad fiber laser or amplifier.

Fiber coupled diode arrays are well known in the art. Examples of such fiber coupled diode arrays are disclosed in U.S. Pat. Nos. 5,675,685; 5,764,675 and 6,377,410 as well as commonly owned U.S. Pat. No. 6,229,939. Examples of such fiber coupled diode arrays are also disclosed in: "Coupling of High Power Diode Lasers and Fibers" by Lina Lee proceedings SPIE, Vol. 4225, Pages 201 and 203, October 2000 and fiber coupling of diode arrays for high brightness; planning considerations by Skutnik, et al., proceedings SPIE, Vol. 4629, pp. 86–93, June 2002. The particular type of fiber coupled diode array is unimportant. An example of a fiber coupled diode array suitable for the present invention is a model number LDF-400 as manufactured by Laserline GmbH (www.laserline.de).

As shown in FIG. 1, the fiber coupled diode array 22 is coupled to a fiber bundle 28. The fiber bundle 28 includes a plurality of peripheral fibers 30, 32, 34, 36, 38 and 40 and a core fiber 42. Each of the optical fibers 44, 46, 48 and 50 from the various semiconductor diodes 52, 54, 56, 58 and 60 are coupled the peripheral optical fibers 30–40. The Stokes seed source 26 is coupled to the core 42 of the fiber bundle 28. The fiber bundle 28 is optically coupled to the Raman amplifier 24 formed from a dual clad fused silica fiber 62. As shown in FIG. 1 the dual clad fused silica fiber includes a core 64; an inner cladding 66; and an outer cladding 68. The core 66 of the dual clad fused silica fiber 62 is optically coupled to the core 42 of the fiber bundle. As such, the Stokes seed source 26 is confined to the inner core 64 of the dual clad fused silica fiber 62.

The Stokes seed source may be a laser, preferably a semiconductor laser, with wavelength and spectral bandwidth properties appropriate for efficient amplification and power conversion from pump light into Stokes radiation by stimulated Raman scattering in the central core of a dual-clad Raman fiber. In particular, the Stokes seed optical frequency may be selected to be less than that of the pump light frequency by an amount equal to the Raman frequency shift. This Raman shift is approximately 13 THz in typical fused silica fibers, and it can vary in other materials with different constituents, such as tellurite glasses that have Raman shift of approximately 22 THz. The Stokes seed spectral bandwidth is preferably narrower than that of the pump light spectrum for maximum Raman amplification and pump-to-Stokes power conversion efficiency. The narrower Stokes spectral bandwidth is also useful in applications which higher spectral power density is advantageous, such as optical pumping of laser media with relatively precise wavelength requirements.

The Stokes seed radiation from above laser source is first coupled into an optical fiber using means similar to those used to collect diode light into the pump light fibers. The Stokes seed fiber is then coupled to the central core of the Raman fiber as an input to be amplified by the fiber-coupled pump light in the inner cladding of the Raman fiber.

The inner cladding 66 of the dual clad fused silica fiber 62 is formed with a sufficient area so as to mate with the optical fibers 30–40 of the fiber bundle 28. In other words, the cross-sectional area of the inner cladding 66 must be equal to or larger than the cross-sectional area of the plurality of optical fibers 30–40 in the fiber bundle 28. For example, for a fiber bundle 28 having six (6) peripheral fibers 30–40 configured as shown in FIG. 1, the inner cladding 66 is formed a hexagonal shape to perform optimum optical coupling efficiency. The inner cladding 66 is surrounded by an outer cladding 68. Different cladding geometries are possible.

The dual clad fiber may be made from glass materials, such as fused silica and tellurite glasses with various dopants, for example, as disclosed in "Tellurite Glasses With Peak Absolute Raman Gain Coefficients Up to 30 Times That of Fused Silica", by R. Stegeman, et al., Optics Letters, vol. 28, no.13, Jul. 1, 2003. The fiber structure consists of a small central core that is sufficiently small to support low-order mode propagation at the Stokes wavelength. The core material is preferably a glass that has large Raman gain coefficient relative to pure fused silica, such as tellurite glasses mentioned in the above reference with 20 to 30 times larger gain coefficient values. The core diameter is typically on the order of 10 to 20 micrometers, and it is surrounded by an inner cladding material whose index of refraction at the Stokes wavelength is slightly less than that of the core material. The index difference is chosen to limit the numerical aperture (NA) of the core to values less than or equal to about 0.15.

The inner cladding uses glasses with much smaller Raman gain coefficient so as to prevent unwanted stimulated Raman scattering in the inner cladding. The inner cladding typically has a non-circular shape, such as a hexagonal or rectangular cross section, with a diagonal dimension on the order of several hundred micrometers, and it is surrounded by an outer cladding whose index of refraction at the diode wavelength is sufficiently less than that of the inner cladding to confine multi-mode propagation with NA values greater than about 0.4. The non-circular shape assures the light in the inner cladding to traverse the core region upon repeated reflections with the inner cladding, thereby providing means for the diode light to amplify the Stokes radiation in the core by stimulated Raman scattering while converting the diode light power into the Stokes beam. The transfer of diode light power in the larger inner cladding into Stokes beam power in the much smaller core is the key process that leads to an output beam having a correspondingly smaller beam and lower divergence. The brightness is proportional to power and inversely proportional to the product of beam size and divergence, and the brightness enhancement factor in the Raman amplifier arises from the large ratio of the inner cladding to core size and the ratio of the respective NA values. For example, 400 micron inner cladding (NA=0.4) with 10 micron core (NA=0.1) can theoretically achieve an enhancement factor of up to about 40×4=160 times in brightness with efficient pump to Stokes power conversion.

The fiber bundle consists of multi-mode fibers whose combined diameter and NA values are less than those of the inner cladding of the Raman amplifier fiber to ensure all diode light is confined within the inner cladding for efficient coupling. The central fiber in the fiber bundle is a single-mode fiber that delivers Stokes seed beam, and the central fiber is fusion spliced to the central core of the Raman amplifier fiber.

As mentioned above, by confining the Stokes seed source 26 to the inner core 64 of the dual clad fused silica fiber 20, stimulated Ramans scattering along the fiber converts the diode laser light in the inner cladding 66 to Stokes radiation having a shifted wavelength. The combined diode light acts as a pump source to amplify the Stokes seed in the central core. Thus, the amplified Stokes beam acquires power from the pump light and confines it in a smaller central core, which has a relatively higher brightness level than known systems which merely combine the output light beams of a plurality of semiconductor diodes.

Obviously, many modifications and variations of the present invention are possible in light of the above teachings. Thus, it is to be understood that, within the scope of the appended claims, the invention may be practiced otherwise than as specifically described above.

We claim:

1. A method for increasing the brightness of a semiconductor laser diode array, the method comprising the steps of:
   (a) providing a fiber coupled diode array coupled to a diode fiber bundle having a core fiber and a plurality of optical fibers concentrically disposed relative to said core fiber, said diode array coupled to said optically coupled to said concentrically disposed fibers;
   (b) providing a dual clad fiber formed with a core, an inner cladding and an outer cladding, said dual clad fiber configured with an inner cladding having sufficient area to optically mate with said concentrically disposed optical fibers;
   (c) providing a Stokes seed source;
   (d) optically coupling said plurality of optical fibers to said inner cladding; and
   (e) optically coupling said Stokes seed source to said core.

2. The method as recited in claim 1, wherein step (b) comprises providing a dual clad fiber formed from a glass material.

3. The method as recited in claim 2, wherein step (b) comprises providing a dual clad fiber formed from fused silica.

4. The method as recited in claim 2, wherein step (b) comprises providing a dual clad fiber formed from tellurite.

5. The method as recited in claim 1, where step (b) comprises providing a dual clad fiber formed with a core, an inner cladding and an outer cladding wherein the index of refraction of the inner cladding is less than the index of refraction of the core.

6. The method as recited in claim 1, wherein step (b) comprises providing a dual clad fiber formed with a core, an inner cladding and an outer cladding wherein the inner cladding has an enclosed, noncircular shape.

7. The method as recited in claim 6, wherein step (b) comprises providing a dual clad fiber with a core, an inner cladding and an outer cladding wherein said inner cladding has a hexagonal cross section.

8. The method as recited in claim 6, wherein step (b) comprises providing a dual clad fiber with a core, an inner cladding and an outer cladding wherein said inner cladding has a rectangular cross section.

9. The method as recited in claim 5, wherein step (b) comprises providing a dual clad fiber formed with a core, an inner cladding and an outer cladding, wherein the index of refraction of the outer cladding is less than the index of refraction of the inner cladding.

* * * * *